B. H. MANN.
COMBINATION AUTOMOBILE LOCK AND THIEF TRAP.
APPLICATION FILED MAY 16, 1921.
1,399,782. Patented Dec. 13, 1921.
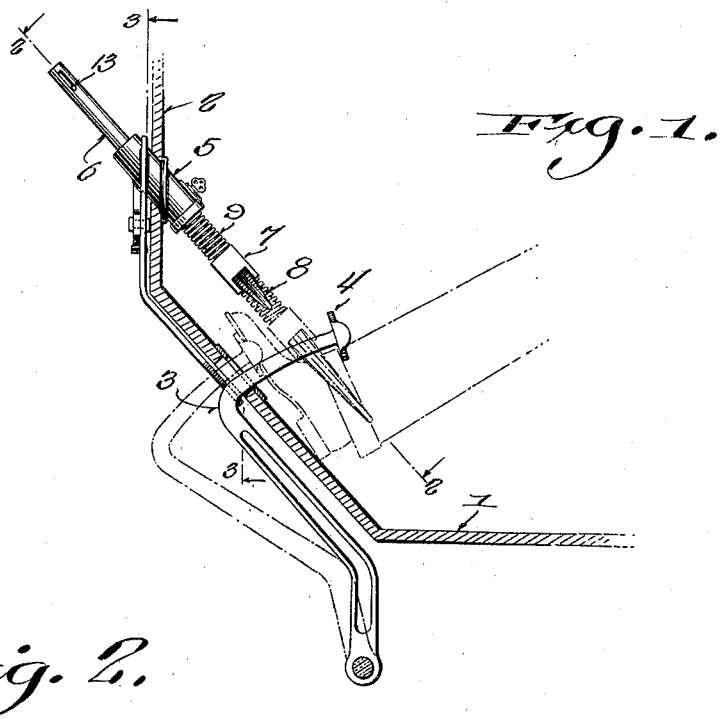
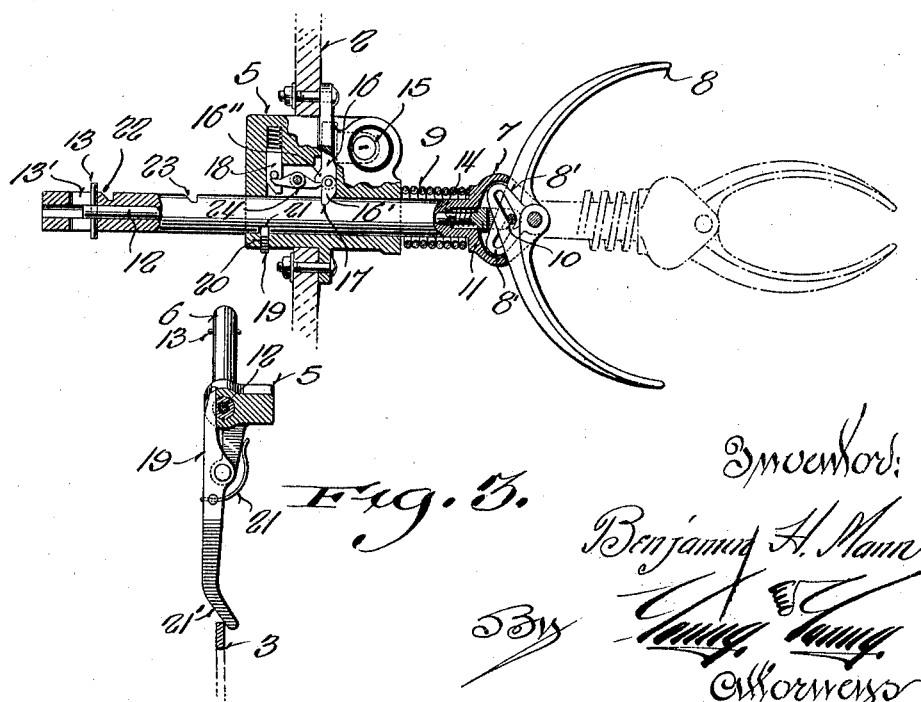

UNITED STATES PATENT OFFICE.

BENJAMIN H. MANN, OF MILWAUKEE, WISCONSIN.

COMBINATION AUTOMOBILE LOCK AND THIEF-TRAP.

1,399,782.  Specification of Letters Patent.  Patented Dec. 13, 1921.

Application filed May 16, 1921. Serial No. 470,096.

*To all whom it may concern:*

Be it known that I, BENJAMIN H. MANN, a citizen of the United States, and resident of Milwaukee, in the county of Milwaukee and State of Wisconsin, have invented certain new and useful Improvements in Combination Automobile Locks and Thief-Traps; and I do hereby declare that the following is a full, clear, and exact description thereof.

This invention pertains to a combination auto lock and thief trap and has primarily for its object to provide means adapted to be automatically actuated, upon operation of one of the control levers of a motor vehicle, to trap the operator and lock the vehicle against operation.

With the foregoing and other objects in view, which will be apparent as the description proceeds, the invention consists in what is herein shown and described and more particularly pointed out and defined by the appended claims.

In the drawings:

Figure 1 is a sectional view through the floor board and dash of a motor vehicle, showing the invention attached thereto.

Fig. 2 is a sectional view through the invention taken on the line 2—2 of Fig. 1, and Fig. 3 is a detail section view taken on the line 3—3 of Fig. 1.

Referring now more particularly to the accompanying drawings, the numeral 1 designates the floor board, and 2 the dash of a motor vehicle. Extending through a slot provided in the floor board is the usual clutch control lever 3, provided with a foot rest 4.

Mounted on the dash and projecting therethrough is a housing 5 secured thereto by bolts or other suitable means. Slidably mounted within the housing and keyed therein to prevent rotary movement is a spindle 6 provided at its outer end with a bifurcated head 7, in which are pivotally mounted a pair of normally expanded gripping jaws 8. Disposed between the head 7 and housing 5 is an expansible spring 9 adapted to project the spindle 6 to that position shown by dotted lines in Fig. 2, when the releasing mechanism is actuated. The pivoted ends of the jaws 8 are provided with slot extensions 8', through the slots of which extends a pin 10 carried by the head 11, which head is formed at one end of a rod 12 extending through the central bore of the spindle 6. The opposite end of the rod 12 carries a pin 13, extending through and projecting beyond the slots 13' in the spindle 6. The purpose of the rod 12 and its connection with the gripping jaws 8 is to contract the same and this is accomplished upon the projection of the spindle 6, which will cause the pin 13 to come in contact with the housing 5, prior to the spindle reaching its projected limit. The final movement of the spindle will thereupon carry the pivoted point of the jaws forward, and the pin 10, being held stationary, will cause the slotted extensions to be contracted, which in turn will contract the jaws 8. When the spindle 6 is in its retracted position, as shown in Fig. 2, a spring 14, disposed between the head 11 and a shoulder provided within the spindle, will force the head 11 and pin 10 forward and hold the jaws in expanded position.

Mounted in the housing adjacent the spindle 6 is a lock 15, of ordinary construction, adapted to manipulate the bolt 16 provided with the pivoted end 16' and projection 16''. The purpose of the bolt 16 is to lock the device against operation so that the same cannot be released upon manipulation of the clutch lever, when it is desired to run the car. In order to set the mechanism when the car is parked or left standing, the bolt 16 by means of the lock 15 is withdrawn from the notch 17 provided in the spindle 6. At the same time, the spring dog 18 is released, and in a manner later described, forced into contact with the spindle. The device is then set for operation and is released through the latch lever 19 pivoted to the bracket 5', depending from the housing 5. The upper end of the lever 19 is disposed in the kerf 20 at one side of the housing and projects into the notch 21' in the spindle 6. The lever 19 is normally held in its latched position by a suitable spring 21 and is tripped upon forward operation of the clutch lever 3 coming in contact with the inclined tail 21''. When the spindle 6 is projected in its farthest forward position, the same is disposed directly over the clutch pedal 4, as indicated by dotted lines in Fig. 1, and is locked against reverse movement in this position by means of the spring dog 18 dropping into the notch 22. Should the spindle 6 be released, through any cause, before the clutch lever is sufficiently depressed, the head 7 will come in contact with the lever 3 and will be locked against return by the dog 18 dropping into an auxiliary notch 23, also provided in the spindle 6. Should this action take place it is obvious that the jaws 8 will not be actuated to grip the operator. However, the head 7 will be so positioned beneath the pedal 4 as to prevent further operation of the clutch lever and will therefore prevent operation of the car.

After the device has been tripped and it is desired to reset the spindle, the bolt 16 through the lock 15 is moved toward the spindle 6, and the pivoted end coming in contact therewith will break, permitting sufficient movement of the bolt, for the projection 16″ to come in contact with the rock lever 24, which will lift the dog 18 against its spring and permit the spindle to be returned to its normal position, at which point the pivoted tail 16′ will drop into the notch 17 locking the spindle against tripping.

From the foregoing, it is obvious that a simple and positive device has been provided which will effectually grasp the leg of a person attempting to operate the clutch lever, and will at the same time prevent further operation of such lever which is essential to running the car.

I claim:

1. The combination with a clutch lever of a device of the character set forth comprising means automatically actuated upon operation of the clutch lever to grip the ankle of the operator.

2. The combination with a clutch lever of a device of the character set forth comprising means automatically actuated upon operation of the clutch lever to prevent further operation of the same and to grasp the ankle of the operator.

3. The combination with a clutch lever of a device of the character set forth comprising means automatically actuated upon operation of the clutch lever to prevent further operation of the same, and means carried by the first mentioned means to automatically grasp the ankle of the operator.

4. The combination with a clutch lever of a device of the character set forth comprising a spindle adapted to be projected upon operation of the clutch lever to lock the same against further operation.

5. The combination with a clutch lever of a device of the character set forth comprising a spindle adapted to be projected upon operation of the clutch lever to lock the same against further operation, and a pair of gripping jaws carried by the spindle adapted to automatically grip the ankle of the operator when the spindle is projected.

6. The combination with a clutch lever of a device of the character set forth comprising a spindle adapted to be projected upon operation of the clutch lever, a pair of normally expanded gripping jaws carried by the spindle, and means for contracting said jaws upon projection of the spindle.

7. The combination with a clutch lever of a device of the character set forth comprising a spindle adapted to be projected upon operation of the clutch lever, a pair of normally expanded gripping jaws carried by the spindle, means for contracting said jaws upon projection of the spindle, and means for locking the spindle against projection.

8. The combination with a clutch lever of a device of the character set forth comprising a spindle adapted to be projected upon operation of the clutch lever, a pair of gripping jaws carried by the spindle, a latch controlled by the clutch lever for releasing the spindle, and means for preventing the release of the spindle.

9. The combination with a clutch lever of a device of the character set forth comprising a housing, a spindle, slidably mounted in said housing and adapted to be projected therefrom, a pair of normally expanded gripping jaws carried by the spindle, and a latch controlled by the clutch lever for releasing said spindle.

In testimony that I claim the foregoing I have hereunto set my hand at Milwaukee, in the county of Milwaukee and State of Wisconsin.

BENJAMIN H. MANN.